United States Patent
Lichtinger et al.

(10) Patent No.: US 9,027,303 B2
(45) Date of Patent: May 12, 2015

(54) AQUEOUS GYPSUM PLASTER-CEMENT COMPOSITION AND ITS USE

(75) Inventors: Hubert Lichtinger, Estepona / Malaga (ES); Bernd Bruno Winfried Eck, Estepona / Malaga (ES)

(73) Assignee: Crupe International (IP) GmbH, Wollerau (CH)

( * ) Notice: Subject to any disclaimer, the term of this patent is extended or adjusted under 35 U.S.C. 154(b) by 63 days.

(21) Appl. No.: 13/821,487

(22) PCT Filed: Sep. 8, 2011

(86) PCT No.: PCT/EP2011/004531
§ 371 (c)(1),
(2), (4) Date: Aug. 21, 2013

(87) PCT Pub. No.: WO2012/031762
PCT Pub. Date: Mar. 15, 2012

(65) Prior Publication Data
US 2013/0326985 A1    Dec. 12, 2013

Related U.S. Application Data

(60) Provisional application No. 61/383,800, filed on Sep. 17, 2010.

(30) Foreign Application Priority Data

Sep. 9, 2010 (DE) .......... 10 2010 044 857
Oct. 13, 2010 (DE) .......... 10 2010 048 339

(51) Int. Cl.
*C04B 28/14* (2006.01)
*E04F 13/04* (2006.01)
(Continued)

(52) U.S. Cl.
CPC ............ *C04B 28/14* (2013.01); *C04B 28/145* (2013.01); *C04B 2111/00146* (2013.01);
(Continued)

(58) Field of Classification Search
USPC ............ 52/344–363, 443–454, 742.12; 106/772, 778, DIG. 2
See application file for complete search history.

(56) References Cited

U.S. PATENT DOCUMENTS 2,526,066 A * 10/1950 Croce ..................... 106/675
2,909,223 A * 10/1959 Kaveler .................. 166/293
(Continued)

FOREIGN PATENT DOCUMENTS

CN    101134344    3/2008
DE    2264075      7/1974
(Continued)

OTHER PUBLICATIONS

Machine translation of DE3322067, 3 pages generated Aug. 8, 2014.*
(Continued)

*Primary Examiner* — Robert Canfield
(74) *Attorney, Agent, or Firm* — Fish & Richardson P.C.

(57) ABSTRACT

An aqueous gypsum plaster-cement composition comprises a hydraulic binder consisting of calcined gypsum and hydraulic cement in a weight ratio of from about 4:1 to about 2:1, an aggregate which comprises sand, a foam, a perlite, rice hulls or a mixture thereof, a superplasticizer comprising an air entraining agent, a retarder, and water in an amount of from about 0.4 to about 0.75 parts by weight per part of binder, with the proviso that the gypsum plaster-cement composition contains essentially neither a pozzolana nor lime. The use thereof, a method of constructing buildings using this composition and the buildings obtainable in this way are also described.

18 Claims, 6 Drawing Sheets

(51) Int. Cl.
*E04B 1/16* (2006.01)
*C04B 111/00* (2006.01)
*C04B 111/10* (2006.01)
*C04B 111/28* (2006.01)
*C04B 111/52* (2006.01)
*E04B 2/84* (2006.01)

(52) U.S. Cl.
CPC .... *C04B 2111/0062* (2013.01); *C04B 2111/10* (2013.01); *C04B 2111/1031* (2013.01); *C04B 2111/28* (2013.01); *C04B 2111/52* (2013.01); *E04F 13/047* (2013.01); *E04B 1/161* (2013.01); *E04B 2/845* (2013.01); *Y10S 106/02* (2013.01)

(56) References Cited

U.S. PATENT DOCUMENTS

| | | | | |
|---|---|---|---|---|
| 3,615,784 | A * | 10/1971 | Cattanach | 524/4 |
| 3,622,656 | A * | 11/1971 | Dewey et al. | 264/35 |
| 3,719,513 | A | 3/1973 | Bragg et al. | 106/640 |
| 3,839,059 | A * | 10/1974 | Rothfelder et al. | 106/644 |
| 4,253,288 | A * | 3/1981 | Chun | 52/454 |
| 4,472,919 | A * | 9/1984 | Nourse | 52/601 |
| 5,033,248 | A * | 7/1991 | Phillips | 52/742.14 |
| 5,718,759 | A | 2/1998 | Stav et al. | |
| 6,162,288 | A | 12/2000 | Kindt et al. | |
| 6,481,171 | B2 * | 11/2002 | Yu et al. | 52/443 |
| 6,527,850 | B2 * | 3/2003 | Schwartz et al. | 106/772 |
| 8,070,878 | B2 * | 12/2011 | Dubey | 106/713 |
| 8,365,489 | B1 * | 2/2013 | Bond | 52/348 |
| 8,733,048 | B1 * | 5/2014 | Hanson | 52/348 |
| 2005/0252128 | A1 * | 11/2005 | Colbert et al. | 52/344 |
| 2005/0257471 | A1 * | 11/2005 | Stevens | 52/443 |
| 2008/0044648 | A1 | 2/2008 | Billings et al. | |

FOREIGN PATENT DOCUMENTS

| | | |
|---|---|---|
| DE | 33 22 067 | 12/1984 |
| DE | 3780674 | 12/1992 |
| DE | 102010048339 | 3/2012 |
| EP | 0241205 | 7/1992 |
| EP | 0 566 413 | 10/1993 |
| EP | 0 744 386 A1 * | 11/1996 |
| GB | 2351286 | 12/2000 |

OTHER PUBLICATIONS

English translation generated Dec. 23, 2014 of CN101134344A, published Mar. 5, 2008, 6 pages.*
International Search Report and Written Opinion mailed Dec. 27, 2011 in international application No. PCT/EP2011/004531, 12 pgs.
Examination Report in Australian Patent Application No. 2011300807, dated Aug. 9, 2013, (3 pages).
Examination Report in Australian Patent Application No. 2011300807, dated Jul. 23, 2014, (4 pages).
English translation of Office Action in Chinese Patent Application No. 201180030477.9, dated Aug. 4, 2014.
English translation of Examination Report in German Patent Application No. 102010048339.7, dated Jun. 16, 2011.
English translation of Decision to Grant in German Patent Application No. 102010048339.7, dated Nov. 26, 2013.
Examination Report in European Patent Application No. 11758127.2, dated Jul. 3, 2014.
Examination Report in New Zealand Patent Application No. 607355, dated Oct. 30, 2013, (2 pages).
Examination Report in New Zealand Patent Application No. 607355, dated Jul. 17, 2014, (1 page).
Notice of Acceptance in New Zealand Patent Application No. 607355, dated Jul. 17, 2014 (4 pages).
Examination Report dated Nov. 12, 2014, in counterpart Canadian Patent Application No. 2,809,604, 5 pgs.

* cited by examiner

AQUEOUS GYPSUM PLASTER-CEMENT COMPOSITION AND ITS USE

CROSS-REFERENCE TO RELATED APPLICATIONS

This application is a national stage application of PCT Patent Application No. PCT/EP2011/004531, filed on Sep. 8, 2011 and published as WO 2012/031762, which claims priority to the following applications: German Patent Application No. 10 2010 044 857.5, filed on Sep. 9, 2010; U.S. Provisional Patent Application No. 61/383,800, filed on Sep. 17, 2010; and German Patent Application No. 10 2010 048 339.7, filed on Oct. 13, 2010. The entire contents of each of the foregoing applications are incorporated by reference herein.

BACKGROUND OF THE INVENTION

The invention relates to an aqueous gypsum plaster-cement composition, its use in the construction of buildings, a method of constructing buildings in which the composition is used and also buildings constructed by the method.

Aqueous gypsum plaster-cement compositions comprising calcined gypsum, which is known to contain calcium sulfate hemihydrate, and cement are known and are used, for example, for producing boards.

However, the known compositions are generally processed by casting.

It was an object of the invention to develop an aqueous gypsum plaster-cement composition which can easily be processed, e.g. sprayed.

SUMMARY OF THE INVENTION

In a first aspect, the invention provides an aqueous gypsum plaster-cement composition comprising a hydraulic binder composed of calcined gypsum and hydraulic cement in a weight ratio of from about 4:1 to about 2:1, an aggregate which comprises sand, a foam, perlite, rice hulls or a mixture thereof, a superplasticizer comprising an airentraining agent, a retarder and water in an amount of from about 0.4 to about 0.75 parts by weight per part of binder, with the proviso that the mixture is essentially, preferably completely, free of pozzolanas and lime.

The dependent claims concern advantageous embodiments of the invention.

The invention further provides for the use of the aqueous gypsum plaster-cement composition in the construction of buildings.

In a further aspect, the invention provides a method of constructing a building which comprises a steel, wood or plastic framework, wherein metal and/or plastic meshes are fastened to the steel, wood and/or plastic framework and are stretched between the framework and the aqueous gypsum plaster-cement composition of the invention is then sprayed onto the meshes and the steel, wood or plastic framework.

The invention further provides buildings which can be produced by the method.

DETAILED DESCRIPTION

Figure 1:
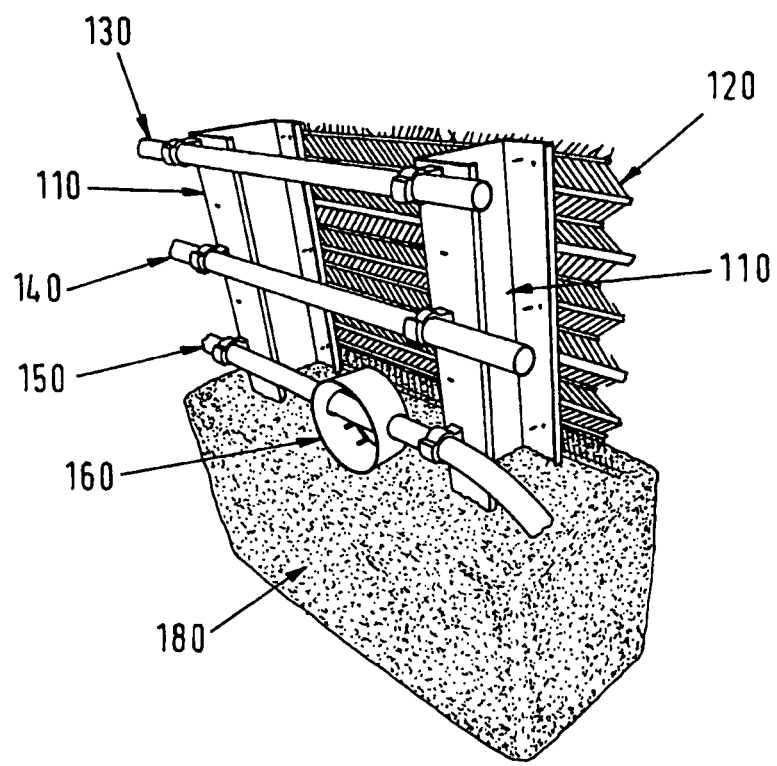
FIG. 1 shows a perspective interior view of a building construction which is partly produced by using the aqueous gypsum plaster-cement composition of the invention.
Figure 2:
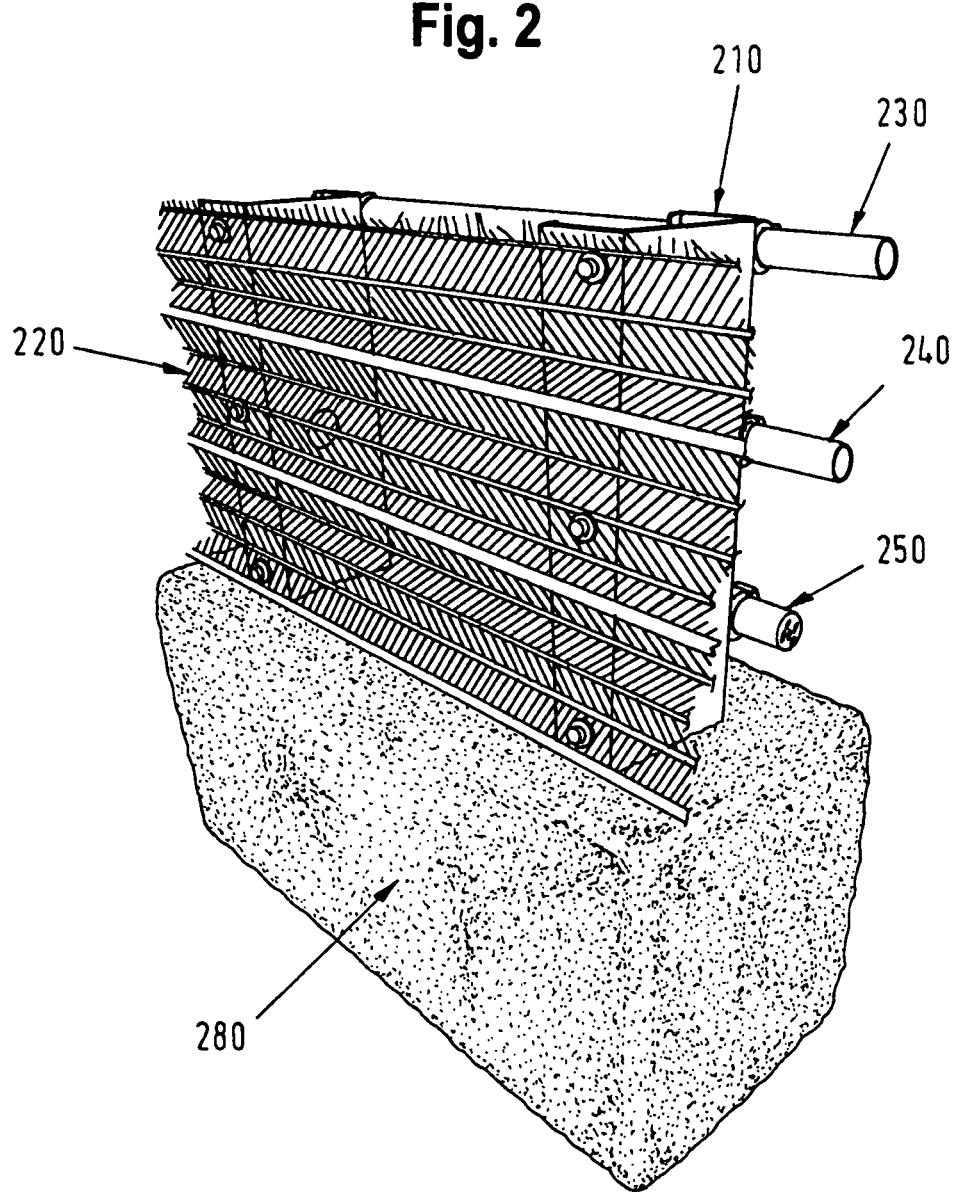
FIG. 2 shows the corresponding perspective exterior view.
Figure 3:
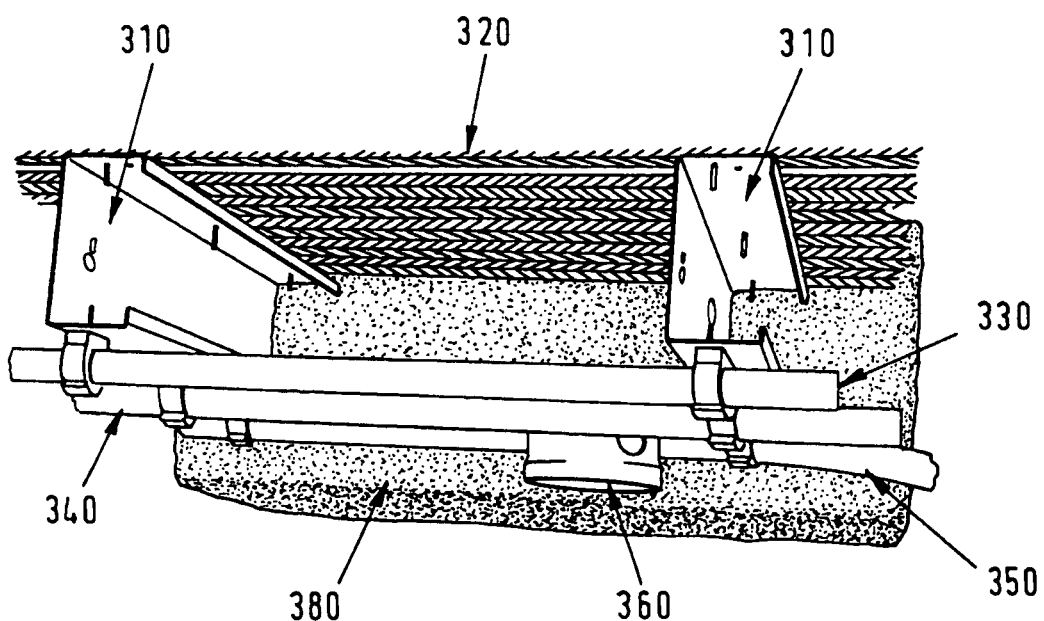
FIG. 3 shows a plan view onto the perspective views of FIGS. 1 and 2.
Figure 4:
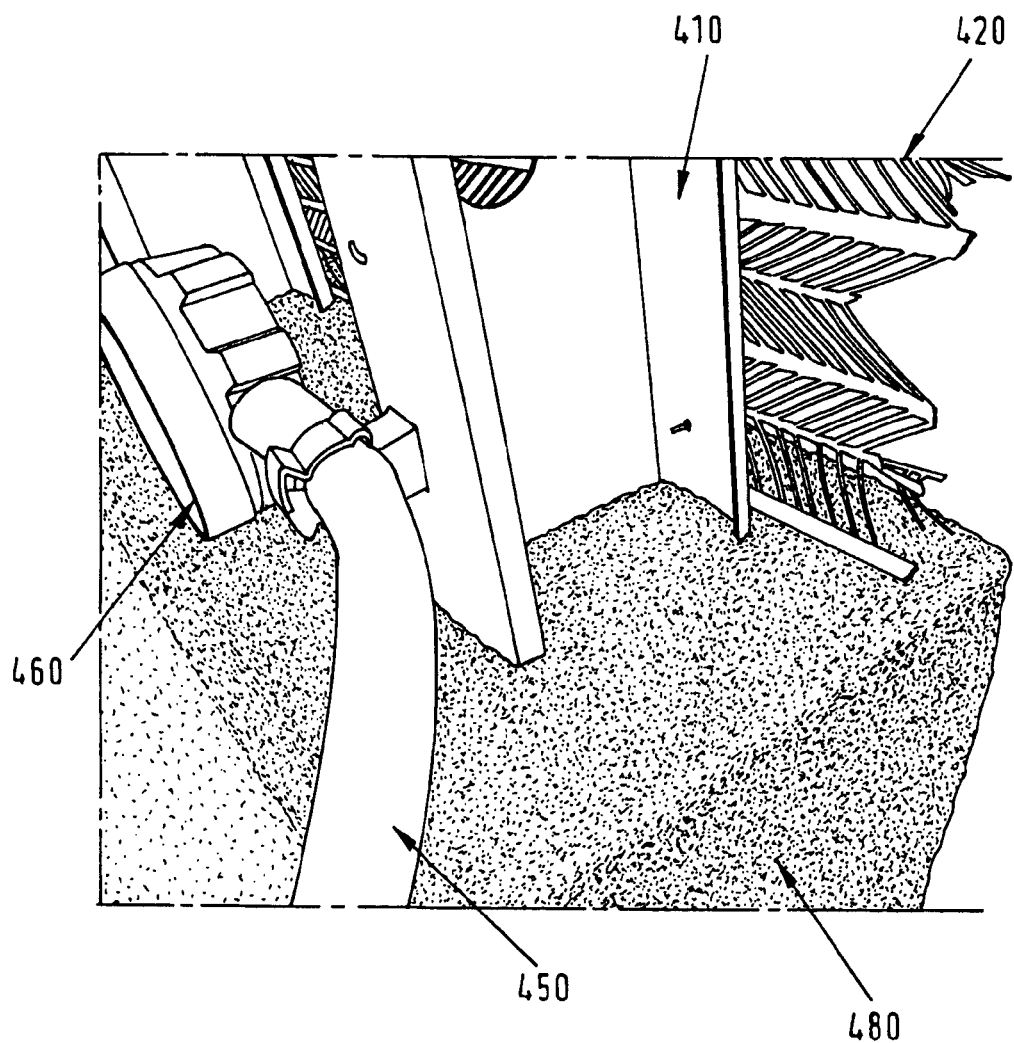
FIG. 4 shows a detail of the perspective view of FIG. 1.
Figure 5:
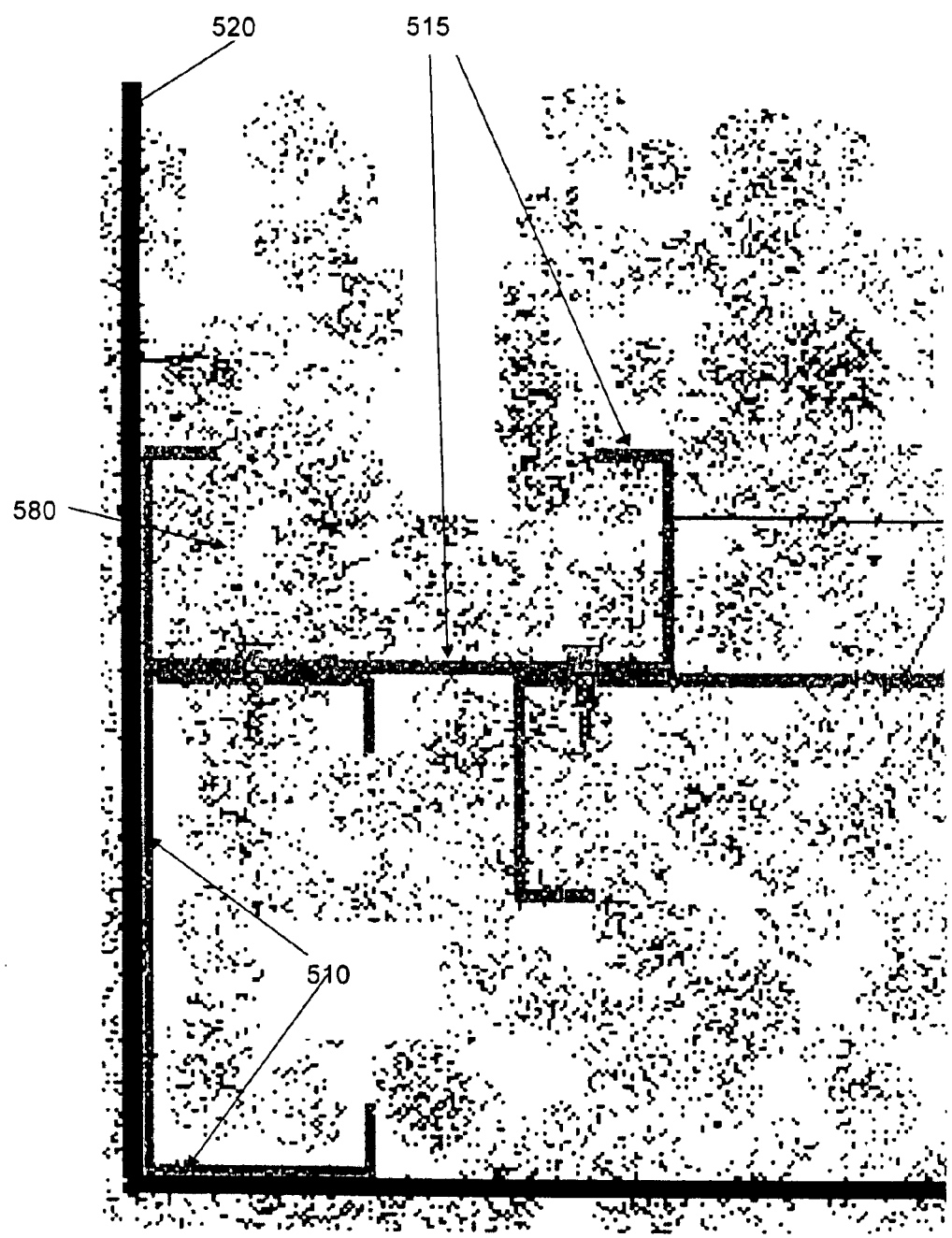
FIG. 5 shows the configuration of a corner.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

An aqueous gypsum plaster-cement composition which is easy to process, i.e. is relatively fluid but has a sufficient viscosity to remain adhering to vertical surfaces without running downward in the unhardened state, is desirable. By means of such a composition, it may be possible to avoid formwork into which cement is poured for the construction of walls, etc. In particular, a sprayable mixture would be highly desirable since it could be sprayed directly onto vertical support elements and then be allowed to harden. It is naturally a prerequisite that walls cast in this way are mechanically stable.

The mixture of the invention has the viscosity necessary to be able to be processed easily, in some embodiments even be sprayable and nevertheless adhere well to vertical surfaces without flowing downward in the unhardened state. After hardening, it has sufficient mechanical strength to be able, on a suitable support, to serve as wall, roof, floor or in some embodiments even as intermediate ceiling.

The hydraulic binder used in the composition of the invention consists essentially of calcined gypsum and hydraulic cement in a weight ratio of from about 4:1 to about 2:1 or else about 2.5:1.

Calcined gypsum comprises calcium sulfate hemihydrate ($CaSO_4 \cdot 1/2 H_2O$) and can be produced from gypsum containing calcium sulfate dihydrate by calcination. The gypsum can be, for example, natural gypsum or FGD (flue gas desulfurization) gypsum. Natural gypsum contains not only calcium sulfate dihydrate but generally also from about 5 to about 22% by weight of inert materials, but sometimes up to 50% by weight of inert materials, which consist predominantly of clay and sand. FGD gypsum generally contains about 95% by weight of calcium sulfate dihydrate and about 5% by weight of inert materials. Calcium sulfate hemihydrate can occur in two modifications, viz. alpha-hemihydrate and beta-hemihydrate. Both react with water to reform calcium sulfate dihydrate (the actual gypsum). Both modifications can be used either individually or in admixture in the invention.

As is known, hydraulic cement hardens by chemical interaction with water, even when it is located underwater. There are a number of types of hydraulic cement which can be used in the building industry, e.g. portland cement, slag cement such as blast furnace slag cement, metallurgical plant cement, supersulfated cement, aluminum-containing cement, high-alumina cement and trass cement.

In the present invention, a cement, preferably portland cement, which is essentially, preferably completely, free of pozzolanas is used. The constituents and properties of pozzolana-free portland cement are comprehensively described in the technical literature (see, for example, G. C. Bye "Portland Cement—Second Edition", Thomas Telford Publishing (1999)). Particular preference is given to the low-iron grade of portland cement CEM I—52,5/42,5 Weiβ (white).

The ratio according to the invention of calcined gypsum to hydraulic cement is generally from about 4:1 to about 2:1, preferably from about 3.5:1 to about 2.5:1 and particularly preferably about 3:1.

The hydraulic binder of the composition as well as the overall gypsum plaster-cement composition of the invention contains essentially neither a pozzolana nor lime, i.e. equal to or less than about 2% by weight of pozzolana, preferably equal to or less than about 1 or even about 0.5% by weight of pozzolana and most preferably equal to or less than about 0.1% by weight of pozzolana, and equal to or less than about 0.5% by weight of lime, preferably less than 0.1% by weight of lime. Mixtures according to the invention containing less than 0.1% by weight of pozzolana and less than 0.1% by weight of lime are here referred to as completely free of pozzolana and lime.

In some embodiments, the aqueous gypsum plaster-cement composition of the invention contains sand as aggregate. This can be any sand such as river sand, shell sand, volcanic sand, e.g. silica sand from volcanic rock, or drift sand. Among the three particle size classes coarse sand (0.63-2 mm), medium sand (0.2-0.63 mm) and fine sand (0.063-0.02 mm), preference is given to medium sand. Very light-colored grades, e.g. crushed sand, are likewise preferred. Sand is, if it is used as sole aggregate, normally used in a ratio of sand to binder of from about 1.8:1 to about 1.2:2, preferably about 1.5:1.

In some embodiments, the aqueous gypsum plaster-cement composition of the invention contains foam and/or perlite and/or rice hulls (threshing residues) as aggregate.

The foam can in principle be any foam, e.g. thermoplastic foams such as expanded polystyrene (EPS; best-known brand: Styrofoam®), polyurethane foam, expanded polypropylene (EPP), expanded PVC (EPVC), elastomeric foams such as flexible polyurethane (PUR) foam and nitrile-butadiene (NBR) foam and also thermoset foams such as rigid PUR foam and phenol-formaldehyde (PF) foam. Expanded polystyrene is preferred.

It is possible to use new and/or recycled foams.

The particle size of the foam is preferably in the region of about 0.25 or from about 0.5 to about 6 mm, especially from about 1 to about 4 or about 3 mm.

The perlite used as aggregate is generally an expanded perlite. It can be impregnated with silicone. In general, it is used in a size of from about 0.25 mm to about 5 mm or preferably about 4 mm or about 3 mm. Perlites are commercially available in many variations.

Rice hulls (threshing residues) can also be used as aggregate. They are a waste product in rice production and are therefore a desirable aggregate from an ecological point of view.

When foam, perlite or rice hulls are used as sole aggregate, their weight ratio to the binder is generally from about 0.02:1 to about 0.065:1. In another embodiment, foam, perlite or rice hulls are used in an amount of from about 2.8 to about 1.8 l, preferably about 2.72-about 2.27 l, per kg of binder.

The composition of the invention can also and preferably contain polymer fibers for reinforcement. The polymers can be selected from among all known synthetic and natural polymers, for example polyvinyl alcohol, acrylic resin and polypropylene. Polypropylene is preferred.

The length of the fibers is generally from about 3 to about 9 mm, preferably from about 4 to about 8 mm, e.g. it can be advantageous for about 50% of the fibers to have a length of about 4 mm and about 50% of the fibers to have a length of about 8 mm.

In addition, it is possible to add, for example, cork, granulated cork, coconut fibers, expanded clay, pumice, wood shavings, siliceous rock material in the form of vitrified and expanded pellets and/or wood chips and the like to the composition.

As retarders, it is possible to use, for example, various phosphate salts, borax, polymeric and copolymeric retarders, such as ligninsulfonates and cellulosics, amino acid-, poly (amino acid)- and modified polypeptide or protein-containing retarders and oxycarboxylic acids, such as gluconic acid, tartaric acid, malic acid and citric acid, and salts thereof; and mixtures thereof. The above retarders are commercially available, e.g. from Innophos, Inc., Cranbury, N.J., USA; RCF Chemie+Faser GmbH, Hamburg, Germany; Akzo Nobel Functional Chemicals, LLC, Cellulosic Specialities, Brewster, N.Y., USA; Sika Deutschland GmbH, Stuttgart, Germany; Fritz-Pak Corporation, Mesquite, Tex., USA; National Gypsum Company, Charlotte, N.C., USA; Tricosal Bauabdichtungs-GmbH, Illertissen, Germany; BK Giulini GmbH, Ladenburg, Germany; Amstel Products by, Ouderkerk aan de Amstel, The Netherlands; FH Diedrichs & Ludwig Post GmbH, Mannheim, Germany; Pentachem s.r.l., S. Clemente (RN), Italy; Geistlich Ligamenta AG, Schlieren, Switzerland; UD Chemie GmbH, Wörrstadt, Germany; Dr. Paul Lohmann GmbH KG, Emmerthal, Germany; and Jungbunzlauer AG, Basel, Switzerland. Depending on the final use of the composition, cellulosics, amino acid-, poly(amino acid)- and modified polypeptide or protein-containing retarders and oxycarboxylic acids, in particular citric acid, and the salts thereof are preferred.

The amounts used depend on the specific retarder used and can easily be determined by a person skilled in the art in accordance with requirements. If, for example, citric acid is used as retarder, it is generally used in an amount of from about 6 to about 8 g, e.g. about 7 g, per kg of binder. This generally gives a processing time to hardening of the mixture of about 60 minutes.

The superplasticizer used usually comprises an organic superplasticizer, e.g. based on lignosulfonates, optionally modified melaminesulfonates, e.g. melamine formaldehyde sulfonates, naphthalenesulfonates and polynaphthalinsulfonates, protein and hydrolyzed protein-containing materials, polycarboxylates or polycarboxylate ethers or a mixture thereof. Such superplasticizers are e.g. available from BASF AG, Ludwigshafen, Germany; Sika Deutschland GmbH, Stuttgart, Germany; Desmopol, Ambt Delden, The Netherlands; and American Casein Company, Burlington, N.J., USA.

The air entraining agent generally has a surfactant-like structure. One class of air entraining agents (e.g. sodium oleate, sodium salt of abietic acid or vinsol resin) forms water-insoluble calcium salts with calcium hydroxide. Another class (e.g. sodium lauryl sulfate, sodium olefin sulfonates, sodium dodecylphenylsulfonate or alkyl benzene sulfates) forms water-soluble calcium salts with calcium hydroxide. A newer class of air pore formers comprises microparticles filled with water. Neutral surfactants and amino acid-containing or polypeptide/proteinaceous materials may also be contained in air entraining agents. Mixtures of air entraining agents may also be used in the present invention. Such air entraining agents are available e.g. from BASF AG, Ludwigshafen, Germany; Fritz-Pak Corporation, Mesquite, Tex., USA; Airemor, Inc., Gainesville, Fla., USA; The Euclid Company, Cleveland, Ohio, USA; Hansa Group AG, Düren, Germany; Real Point, Malaysia; Evonik Industries AG, Essen, Germany; RCF Chemie und Faser GmbH, Hamburg, Germany; und Berolan GmbH, Perg, Germany.

Some agents referred to as superplastizers also possess air entraining properties, and some agents referred to as air entraining agents also possess properties of a superplasticizer.

This is meant to be expressed by the phrase: "a superplasticizer, comprising an air entraining agent", which is intended to mean that this may be: a mixture of a superplasticizer and an air entraining agent, a superplasticizer also having air entraining properties, or an air entraining agent also having properties of a superplasticizer. This could also be termed as "one or more agents acting as superplasticizer and air entraining agent." In the following, this is sometimes simply denoted by the term "superplasticizer/air entraining agent".

The superplasticizer/air entraining agents are usually employed in an aqueous solution which may also comprise an antibacterial agent, an anti-mold agent and the like.

According to the present invention, preference is given to using a mixture of anionic and nonionic surfactants which also comprises sodium benzoate, magnesium sulfate and zinc pyrithione as superplasticizer/air entraining agent. A superplasticizer/air entraining agent comprising amino acid-containing or polypeptide/proteinaceous material may also preferably be used.

The ratio of water (including the amount of water used for the solution of the plasticizer/air entraining agent) is generally from about 0.4 to about 0.75 or else 0.70 parts by weight of water per kg of hydraulic binder. The weight ratio of water to binder is preferably about 0.45-0.68:1, particularly preferably about 0.5-0.65:1. Here, the aqueous solution of plasticizer and air entraining agent generally makes up from about 50 to about 60% of the total amount of water, but can also deviate therefrom.

The aqueous gypsum plaster-cement composition of the invention has a relatively low viscosity so that it can be processed easily and is sprayable in preferred embodiments, i.e. it can be sprayed onto substrates using a suitable spraying apparatus.

To produce the aqueous gypsum plaster-cement composition, the hydraulic binder, the retarder and optionally the fibers are usually firstly thoroughly mixed dry, then the foam, the perlite, the rice hulls or a mixture thereof and/or the sand and optionally further additives are added thereto while continuing to mix. This hydraulic binder-containing mixture can be packed in sacks for storage. The solution of plasticizer and of air entraining agent is then premixed with the required amount of water and added to the hydraulic binder-containing mixture with thorough mixing. The aqueous gypsum plaster-cement composition can then be processed promptly, preferably by spraying.

The advantages offered by the preferred embodiments of the mixture of the invention include, inter alia, that it is very light and can be sprayed onto vertical substrates. It has a low viscosity and a suitable weight to be able, firstly, to be sprayed but, secondly, not to flow down on the vertical substrate. This makes very quick and monolithic construction of buildings possible.

The aqueous gypsum plaster-cement composition of the invention is used, for example, for producing gypsum plasterboards, stucco profiles, flat blocks/lightweight building blocks, as thermal insulation material, as acoustically insulating and fire-retarding plaster and for construction of buildings. It is particularly preferably used for the latter application.

The composition can be used to produce, for example, gypsum plasterboards or stucco profiles for interior and exterior use.

However, particular preference is given to using the composition in the production of buildings using a framework which is in principle known from "lightweight steel construction" (see explanation below).

In the use according to the invention, the composition of the invention is simply sprayed onto steel or plastic meshes which are fastened to steel, plastic or wood light sections and stretched between the light sections and allowed to dry. In this way, walls having a thickness of, for example, up to about 30 cm can be sprayed onto the meshes in a single operation.

Furthermore, the aqueous gypsum plaster-cement composition of the invention can be used for exterior thermal insulation and/or noise insulation and as thermal insulation render.

The invention further provides a method of constructing a building comprising a steel, wood or plastic framework, wherein metal or plastic meshes are fastened on the steel, wood or plastic framework and stretched between the elements of the framework and aqueous gypsum plaster-cement composition as described above is sprayed onto the meshes and the steel, wood or plastic framework.

The aqueous gypsum plaster-cement composition is preferably sprayed on in such a way that the building does not have any gaps or interstices which are not covered by the composition apart from the windows and doors.

The invention also provides buildings which can be produced by the above method which is described in more detail below.

In conventional lightweight steel construction, a framework is constructed from steel light sections (known as post and beam construction) and this is then covered with space-delineating board materials (see, for example: document 560 "Häuser in Stahl-Leichtbauweise", $1^{st}$ edition 2002, issued by Stahl-Informations-Zentrum Düsseldorf).

In the method of the present invention, the framework made of steel light sections or else wood or plastic light sections (hereinafter also referred to as "steel, wood or plastic framework" or simply "framework") is not covered with boards but instead plastic or steel meshes are fastened to the frame and stretched between the individual steel, wood or plastic light sections, and the aqueous gypsum plaster-cement composition of the invention is then sprayed onto these meshes as well as onto the framework and allowed to dry. Alternatively, the gypsum plaster-cement composition can be applied manually onto the meshes and onto the framework This is a monolithic mode of construction since exterior and interior walls are made up of a single material.

The aqueous gypsum plaster-cement composition is preferably sprayed on are manually applied in such a way that the building does not have any gaps or interstices which are not covered by the composition apart from the windows and doors, i.e. no joins and heat bridges of any type are formed, in contrast to covering with boards.

Figure 6:
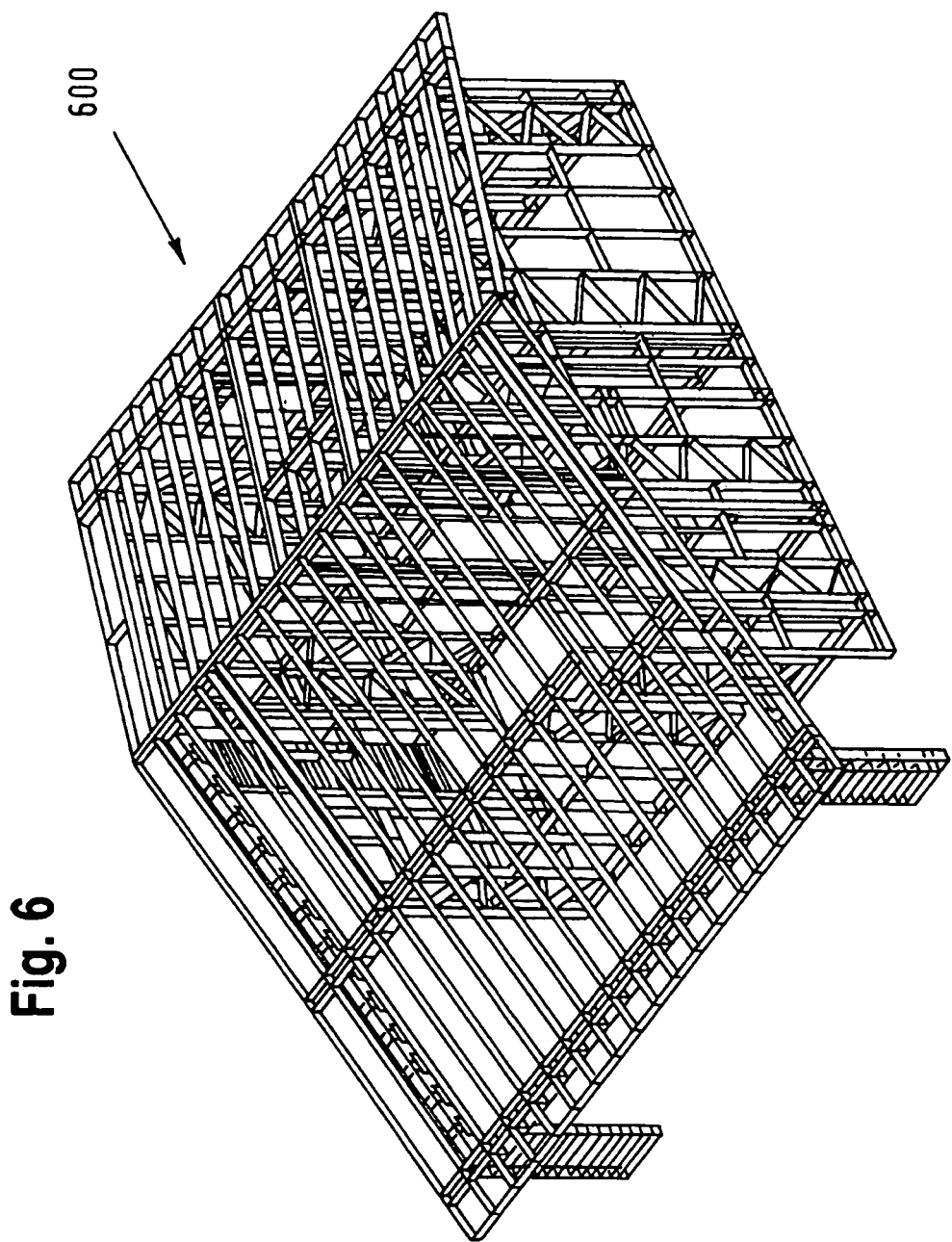
FIG. 6 shows a steel light section framework.

The construction of a building according to the invention will now be described with the aid of the figures. In the construction of a building, a steel, wood or plastic framework is firstly constructed, as shown in FIG. 6 for a steel framework 600. The corners of the future building are specially reinforced by further framework elements 515. Metal and/or plastic meshes 120, 220, 320, 420, 520 are then installed on and between all steel, wood or plastic framework elements 110,

210, 310, 410, 510 with the exception of the reinforcing elements 515, e.g. by means of rivets or nails, so as to form the support for the future exterior and interior walls and the roof (windows and doors are left open). The required heating pipes 130, 230, 330, water pipes 140, 240, 340 and electric conduits 150, 250, 350, 450 to which empty casings 160, 460 are fixed at the envisaged places are subsequently fastened directly on the frame elements 110, 310, 410, 510 on the inside of the steel frame 600. As an alternative, the heating pipes 130, 230, 330, water pipes 140, 240, 340 and electric conduits 150, 250, 350, 450 can also be fastened later to the finished interior wall by milling. The aqueous gypsum plaster-cement composition of the invention 180, 280, 380, 480, 580 is then sprayed on or alternatively applied manually in such a way that no gaps or interstices remain in the walls, with the heating pipes 130, 230, 330, water pipes 140, 240, 340 and electric conduits 150, 250, 350, 450, if they have already been installed, being embedded and thereby advantageously being insulated. The roof is likewise constructed by stretching meshes between the corresponding framework elements and subsequently spraying on or manually applying the aqueous gypsum plaster-cement composition of the invention without leaving gaps between the roof and the walls. A thickness of the aqueous gypsum plaster-cement composition of from about 2 cm to about 30 cm can be sprayed on in one spraying operation.

For the flooring, which likewise adjoins the walls without leaving a gap, a specific embodiment, e.g. that of Example 4, of the aqueous gypsum plaster-cement composition of the invention is used.

It is possible to construct single-story and multistory (at present up to about 4 stories, but more stories are planned) dwellings by the above-described method. Ceilings and floors are produced in a manner analogous to the walls. The steel, wood or plastic framework corresponds to that known from conventional lightweight steel construction, except that meshes instead of boards are fastened to the underside of the lightweight construction elements which later form the floors or ceilings as in the case of the walls and these meshes are filled on the upper side up to about floor height with the composition according to the invention by spraying or manual application and are sprayed or manually applied onto the underside with a cladding layer of the composition according to the invention. However, in contrast to conventional lightweight steel construction, no wind braces are required. The composition of the invention in its embodiments envisaged for this purpose (see examples) has sufficient compressive strength to allow this method.

Compared to conventional lightweight steel construction with board covering, greater flexibility of the geometry of the framework is possible since no rigid spacing set by the size of the boards has to be adhered to, but instead the geometry of the frame can be determined solely by the requirements of statics.

This method makes it possible to construct buildings within a very short time. Thus, for example, the ready-to-move-in construction of an individual dwelling house, e.g. having a living area of about 100 m², can take about one month from the turn of the first sod. Furthermore, the buildings are generally very well insulated thermally, against fire and acoustically.

The invention also provides buildings which can be constructed by the above method, i.e. buildings which have a steel, wood or plastic framework around and between which metal and/or plastic meshes are stretched and are monolithically covered by the gypsum plaster-cement composition. There are preferably no joins or gaps in the entire building material for walls, ceilings, floors and the roof.

The following examples illustrate the invention without limiting the invention thereto.

EXAMPLES

Example 1

An aqueous gypsum plaster-cement composition was produced from the following constituents:
Constituents
  Hydraulic binder:
    330 kg of calcined gypsum (Yeso Normal, manufacturer: YESOS LAS LAGUNAS S.A., Archidona, (Malaga), Spain)
    110 kg of portland cement CEM I—52,5/42,5 Weiβ (white)
  100 kg of sand (local crushed sand 0.25-2.00 mm)
  1000 l of expanded polystyrene (EPS; 1-4 mm, recycled granulated material or freshly produced EPS)
  3.080 kg of citric acid
  0.54 kg of polypropylene fibers (length: 50% by weight 4 mm, 50% by weight 8 mm)
  dissolved in water: superplasticizer/air entraining agent (Crupe 63 concentrate from Crupe S.L.; Malaga, Spain), comprising anionic and nonionic surfactants and sodium benzoate, magnesium sulfate and zinc pyrithione
  water in such an amount that the total amount of water is about 220 kg.

Binder, citric acid and polypropylene fibers are mixed until homogeneous, the sand and the EPS are then added and mixing is continued until the mixture is homogeneous. This dry mixture is packed in sacks for storage.

On site, the dry mix is mixed into the mixing device of a mortar pump (e.g. Turbosol Talent, Putzmeister SP11) and the mixture containing the superplasticizer/air entraining agent and the water are optionally premixed via a metering unit and then mixed into the dry mix.

The aqueous gypsum plaster-cement composition obtained in this way is then immediately sprayed by means of the mortar pump with addition of air out of the application gun.

The mixture of Example 1 is, for example, used for the construction of exterior and interior walls and floors/ceilings in monolithic building construction by the steel, wood or plastic frame construction method.

Example 2

An aqueous gypsum plaster-cement composition was produced from the following constituents:
Constituents
  Hydraulic binder:
    330 kg of calcined gypsum (Yeso Normal, manufacturer: YESOS LAS LAGUNAS S.A., Archidona, (Malaga), Spain)
    110 kg of portland cement CEM I—52,5/42,5 Weiβ (white)
  1000 l of expanded polystyrene (EPS; 1-4 mm, recycled granulated material or freshly produced EPS)
  3.080 kg of citric acid
  0.44 kg of polypropylene fibers (length: 50% by weight 4 mm, 50% by weight 8 mm)
  dissolved in water: superplasticizer/air entraining agent (Crupe 63 concentrate from Crupe S.L.; Malaga, Spain), comprising anionic and nonionic surfactants and sodium benzoate, magnesium sulfate and zinc pyrithione
  water in such an amount that the total amount of water is about 220 kg.

Binder, citric acid and polypropylene fibers are mixed until homogeneous, the EPS is then added and mixing is continued until the mixture is homogeneous. This dry mixture is packed in sacks for storage.

On site, the dry mix is mixed into the mixing device of a mortar pump (e.g. Turbosol Talent, Putzmeister SP11) and the mixture containing the superplasticizer/air entraining agent and the water are optionally premixed via a metering unit and then mixed into the dry mix.

The aqueous gypsum plaster-cement composition obtained in this way is then immediately sprayed by means of the mortar pump with addition of air out of the application gun.

The mixture of Example 2 is, for example, used for the construction of exterior and interior walls and floors/ceilings in monolithic building construction by the steel, wood or plastic frame construction method.

Example 3

An aqueous gypsum plaster-cement composition was produced from the following constituents:
Constituents
Hydraulic binder:
330 kg of calcined gypsum (Yeso Normal, manufacturer: YESOS LAS LACUNAS S.A., Archidona, (Malaga), Spain)
100 kg of portland cement CEM I—52,5/42,5 Weiß (white)
600 kg of sand (local crushed sand 0.25-2 mm for exterior render, 1.00-4.00 mm for floor screed)
2800 kg of citric acid
1.0 kg of polypropylene fibers (length: 50% by weight 4 mm, 50% by weight 8 mm)
dissolved in water: superplasticizer/air entraining agent (Crupe 63 concentrate (for exterior render) or Crupe 71 concentrate (for floor screed) from Crupe S.L.; Malaga, Spain), comprising anionic and nonionic surfactants and sodium benzoate, magnesium sulfate and zinc pyrithione
water in such an amount that the total amount of water is about 220 kg (for exterior render) or 250-260 kg (for floor screed).

Binder, citric acid and polypropylene fibers are mixed until homogeneous, the sand is then added and mixing is continued until the mixture is homogeneous. This dry mixture is packed in sacks for storage.

On site, the dry mix is mixed into the mixing device of a mortar pump (e.g. Turbosol Talent, Putzmeister SP11) and the mixture containing the superplasticizer/air entrainment agent and the water are optionally premixed via a metering unit and then mixed into the dry mix.

The aqueous gypsum plaster-cement composition obtained in this way is then immediately sprayed by means of the mortar pump with addition of air out of the application gun.

The mixture of Example 3 is used, for example, as self-leveling screed for flooring or as exterior render.

Example 4

An aqueous gypsum plaster-cement composition was produced from the following constituents:
Constituents
Hydraulic binder:
330 kg of calcined gypsum (Yeso Normal, manufacturer: YESOS LAS LAGUNAS S.A., Archidona, (Malaga), Spain)
110 kg of portland cement CEM I—52,5/42,5 Weiß (white)
3.080 kg of citric acid
0.54 kg of polypropylene fibers (length: 50% by weight 4 mm, 50% by weight 8 mm)
dissolved in water: superplasticizer/air entraining agent (Crupe 63 concentrate from Crupe S.L.; Malaga, Spain) comprising anionic and nonionic surfactants and sodium benzoate, magnesium sulfate and zinc pyrithione
water in such an amount that the total amount of water is about 220 kg.

Binder, citric acid and polypropylene fibers are mixed until the mixture is homogeneous. This dry mixture is packed in sacks for storage.

On site, the dry mix is mixed into the mixing device of a mortar pump (e.g. Turbosol Talent, Putzmeister SP11) and the mixture containing the superplasticizer/air entraining agent and the water are optionally premixed via a metering unit and then mixed into the dry mix.

The aqueous gypsum plaster-cement composition obtained in this way is then immediately sprayed by means of the mortar pump with addition of air out of the application gun or poured into silicone molds.

The mixture of Example 4 is, for example, used for producing an adhesive for flat blocks (brick/gas concrete blocks or Ytong/Hebel blocks) and for stucco profiles which are cast in silicone molds for interior and exterior use.

Other retarders and other superplasticizers/air entrainment agents, such as those mentioned above, may be used in the compositions prepared in the examples.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The entire contents of all documents cited in this patent application, for example patents, patent applications, books, journal articles, are hereby incorporated by reference.

The invention claimed is:

1. An aqueous gypsum plaster-cement composition comprising:
a hydraulic binder comprising calcined gypsum and hydraulic cement in a weight ratio of from about 4:1 to about 2:1;
an aggregate comprising at least one of sand, a foam, a perlite, and rice hulls;
a superplasticizer comprising an air entraining agent;
a retarder; and
water in an amount of from about 0.4 to about 0.75 parts by weight per part of binder,
wherein the gypsum plaster-cement composition comprises essentially neither a pozzolana nor lime.

2. The gypsum plaster-cement composition as claimed in claim 1, further comprising polymer fibers.

3. The gypsum plaster-cement composition as claimed in claim 1, wherein the composition is sprayable.

4. The gypsum plaster-cement composition as claimed in claim 1, wherein the aggregate comprises sand, and wherein the aggregate is present in the gypsum plaster-cement composition in a weight ratio to the binder of from about 3.5:2 to about 2.5:2.

5. The gypsum plaster-cement composition as claimed in claim 1, wherein the aggregate comprises at least one of expanded polystyrene, expanded perlite, and rice hulls.

6. The gypsum plaster-cement composition as claimed in claim 5, wherein each of the at least one of expanded polystyrene, expanded perlite and rice hulls are present in the composition in a weight ratio to the hydraulic binder of from about 0.02:1 to about 0.065:1.

7. The gypsum plaster-cement composition as claimed in claim 5, wherein at least one of the expanded polystyrene and the expanded perlite has an average particle size of from about 0.5 mm to about 6 mm.

8. The gypsum plaster-cement composition as claimed in claim 7, wherein each of the at least one of expanded polystyrene, expanded perlite and rice hulls are present in the composition in an amount of from about 2.8 L/kg to about 1.8 L/kg of hydraulic binder.

9. The gypsum plaster-cement composition as claimed in claim 1, wherein the aggregate comprises a mixture of sand and at least one of expanded polystyrene, expanded perlite, and rice hulls, with the sand being present in the gypsum plaster-cement composition in a weight ratio to the hydraulic binder of from about 0.2:1 to about 0.3:1 and each of the at least one of expanded polystyrene, expanded perlite, and rice hulls being present in a weight ratio to the hydraulic binder of from about 0.02:1 to about 0.065:1 or in an amount of from about 800 L to about 1200 L per 440 kg of hydraulic binder.

10. The gypsum plaster-cement composition as claimed in claim 1, wherein the retarder comprises at least one member of the group consisting of citric acid and salts thereof, cellulosics, amino acid-containing retarders, poly(amino acid)-containing retarders, modified polypeptide-containing retarders, protein-containing retarders, and oxycarboxylic acids and salts thereof.

11. The gypsum plaster-cement composition as claimed in claim 2, wherein the polymer fibers comprise polypropylene fibers.

12. The gypsum plaster-cement composition as claimed in claim 11, wherein the polypropylene fibers have a length of from about 3 mm to about 9 mm.

13. The gypsum plaster-cement composition as claimed in claim 1, wherein the superplasticizer comprises anionic and nonionic surfactants, sodium benzoate, magnesium sulfate, and zinc pyrithione.

14. A method for fabricating a material, the method comprising forming the material from the aqueous gypsum plaster-cement composition as claimed in claim 1, wherein the material comprises at least one member selected from the group consisting of gypsum plasterboards, stucco profiles, flat blocks, lightweight building blocks, thermal insulation material, acoustically insulating and fire-retarding plaster, and material for construction of buildings.

15. A method of constructing a building comprising a framework formed of at least one of steel, wood, and plastic, the method comprising:
   fastening meshes formed of at least one of metal and plastic onto the framework and stretching the fastened meshes between the elements of the framework; and
   spraying or manually applying an aqueous gypsum plaster-cement composition onto the meshes and the framework,
   wherein the aqueous gypsum plaster-cement composition comprises:
      a hydraulic binder comprising calcined gypsum and hydraulic cement in a weight ratio of from about 4:1 to about 2:1;
      an aggregate comprising at least one of sand, a foam, a perlite, and rice hulls;
      a superplasticizer comprising an air entraining agent;
      a retarder; and
      water in an amount of from about 0.4 to about 0.75 parts by weight per part of binder; and
   wherein the gypsum plaster-cement composition comprises essentially neither a pozzolana nor lime.

16. The method as claimed in claim 15, wherein the aqueous gypsum plaster-cement composition is sprayed or manually applied in such a way that the building does not have any gaps which are not covered by the aqueous gypsum plaster-cement composition apart from the gaps corresponding to windows and doors.

17. A building, comprising:
   a framework comprising elements formed of at least one material selected from the group consisting of steel, wood, and plastic;
   one or more meshes formed of at least one material selected from the group consisting of metal and plastic, wherein the one or more meshes are fastened to the elements of the framework and stretched between the elements; and
   an aqueous gypsum plaster-cement composition applied to the one or more meshes and to the elements of the framework,
   wherein the aqueous gypsum plaster-cement composition comprises:
      a hydraulic binder comprising calcined gypsum and hydraulic cement in a weight ratio of from about 4:1 to about 2:1;
      an aggregate comprising at least one of sand, a foam, a perlite, and rice hulls;
      a superplasticizer comprising an air entraining agent;
      a retarder; and
      water in an amount of from about 0.4 to about 0.75 parts by weight per part of binder; and
   wherein the gypsum plaster-cement composition comprises essentially neither a pozzolana nor lime.

18. The building as claimed in claim 17, wherein the building does not have any gaps which are not covered by the aqueous gypsum plaster-cement composition apart from gaps corresponding to windows and doors.

* * * * *